(12) United States Patent
Zhu

(10) Patent No.: US 10,643,829 B2
(45) Date of Patent: May 5, 2020

(54) PSEUDO INTERNAL STANDARD METHOD, DEVICE AND APPLICATION FOR MASS SPECTROMETRY QUANTITATIVE ANALYSIS

(71) Applicant: GUANGDONG LIANJIE BIOTECHNOLOGY CO., LTD., Guangdong (CN)

(72) Inventor: Janshon Zhu, Guangdong (CN)

(73) Assignee: GUANGDONG LIANJIE BIOTECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 15/762,019

(22) PCT Filed: Aug. 30, 2016

(86) PCT No.: PCT/CN2016/097261
§ 371 (c)(1),
(2) Date: Mar. 21, 2018

(87) PCT Pub. No.: WO2017/050096
PCT Pub. Date: Mar. 30, 2017

(65) Prior Publication Data
US 2018/0269047 A1    Sep. 20, 2018

(30) Foreign Application Priority Data
Sep. 21, 2015   (CN) ............. 2015 1 0603885

(51) Int. Cl.
*H01J 49/00*   (2006.01)
*G01N 30/88*   (2006.01)
(Continued)

(52) U.S. Cl.
CPC .......... *H01J 49/0009* (2013.01); *G01N 30/06* (2013.01); *G01N 30/36* (2013.01);
(Continued)

(58) Field of Classification Search
CPC ....... G01N 2030/042; G01N 2030/045; G01N 30/06; G01N 30/8665; H01J 40/0009; H01J 49/0009
See application file for complete search history.

(56) References Cited

U.S. PATENT DOCUMENTS 6,058,764 A * 5/2000 Yamada ............. G01N 30/8651
422/70
8,628,969 B2 * 1/2014 Kasajima ............... G01N 33/14
424/9.1
(Continued)

FOREIGN PATENT DOCUMENTS

CN      101949899 A    1/2011
CN      101923081 B    5/2012
(Continued)

OTHER PUBLICATIONS

International Search Report for International Application No. PCT/CN2016/097261 dated Dec. 5, 2016.

*Primary Examiner* — Wyatt A Stoffa
(74) *Attorney, Agent, or Firm* — Karen S. Canady; canady + lortz LLP

(57) ABSTRACT

A pseudo internal standard method, device and application for mass spectrometry quantitative analysis is disclosed.

5 Claims, 8 Drawing Sheets

(51) Int. Cl.
   *G01N 30/06*   (2006.01)
   *G01N 30/36*   (2006.01)
   *G01N 30/72*   (2006.01)
   *G01N 30/86*   (2006.01)
   *G01N 30/04*   (2006.01)

(52) U.S. Cl.
   CPC ..... *G01N 30/7233* (2013.01); *G01N 30/8665* (2013.01); *G01N 30/88* (2013.01); *G01N 2030/042* (2013.01); *G01N 2030/8822* (2013.01)

(56) References Cited

U.S. PATENT DOCUMENTS

| | | | | |
|---|---|---|---|---|
| 10,304,670 | B2* | 5/2019 | Cooper | G01N 30/8665 |
| 2006/0255258 | A1* | 11/2006 | Wang | G01N 30/8624 |
| | | | | 250/282 |
| 2010/0100335 | A1* | 4/2010 | Miyagawa | G01N 30/7206 |
| | | | | 702/23 |
| 2011/0045514 | A1* | 2/2011 | Muntendam | G01N 33/6893 |
| | | | | 435/15 |
| 2011/0101215 | A1* | 5/2011 | Hirabayashi | G01N 30/8675 |
| | | | | 250/282 |
| 2014/0158881 | A1* | 6/2014 | Cooper | H01J 49/0009 |
| | | | | 250/282 |
| 2014/0260509 | A1* | 9/2014 | Pohl | G01N 30/02 |
| | | | | 73/1.02 |
| 2015/0073727 | A1* | 3/2015 | Zubarev | G01N 30/8679 |
| | | | | 702/23 |
| 2016/0266074 | A1* | 9/2016 | Ueno | G01N 30/06 |
| 2017/0011897 | A1* | 1/2017 | Yamaguchi | G01N 30/724 |
| 2017/0261524 | A1* | 9/2017 | Hayakawa | G01N 33/6806 |
| 2018/0128794 | A1* | 5/2018 | Sutan | G01N 30/8675 |

FOREIGN PATENT DOCUMENTS

| | | |
|---|---|---|
| CN | 102967680 A | 3/2013 |
| CN | 102539573 B | 4/2013 |
| CN | 103940918 A | 7/2014 |
| CN | 104807921 A | 7/2015 |
| CN | 105223264 A | 1/2016 |
| CN | 105510483 A | 4/2016 |
| WO | 2015064530 A1 | 5/2015 |

* cited by examiner

PSEUDO INTERNAL STANDARD METHOD, DEVICE AND APPLICATION FOR MASS SPECTROMETRY QUANTITATIVE ANALYSIS

FIELD OF THE INVENTION

The present disclosure relates to the field of mass spectrometry quantitative technology, and more particularly relates to a method, a device, and a use of pseudo internal standard for mass spectrometry quantitative analysis.

BACKGROUND OF THE INVENTION

Quantitative analysis basically involves three steps. First, use pure standard of the analyte to prepare calibration solutions at different concentration. Secondly, analyze the calibration solutions and unknown samples to obtain their signal responses. Finally, plot the signal strength (Y) measured from the calibration solutions samples against their concentrations (C) to establish a calibration curve. Concentration of the unknown samples can be calculated from the calibration equation or directly find from the curve. An ideal calibration curve is a straight line that fits a calibration equation $Y=aC+b$. Practically, linearity of a calibration curve only exists in a relatively small range, for example, between concentration 1 and 10. For a wide contraction range, a calibration curve is normally curved becoming a true "curve" that can better fit the equation $Y=ax^2+bx+c$.

To ensure the accuracy of quantitative analysis, the general practice of the field is to implement the Internal Standard (IS) method. Draft of instrument sensitivity over time and erratic sample volume occurred during sample preparation are the major variations that cause inaccuracy in quantitative results. By accurately adding an internal standard, a pure substance (non-analyte), into each sample, then preparing the sample and measuring both the analyte and the internal standard during each analytical run, the variations can be largely cancelled out by taking the ratio of signal strength of the analyte ($I_x$) against that of the internal standard ($I_{is}$). When the analyte signal ($I_x$) rises or falls either due to change of sensitivity in the instrument or accidental error in sample volume, the internal standard signal would rise or fall accordingly, and the ratio of the signals ($I_x/I_{is}$) would remain unchanged. Therefore, for quantitative analysis using internal standard method, the calibration curve is the plot of the signal ratio ($Y=I_x/I_{is}$) against concentration (C). Since errors introduced during the sample processing are human error that could be avoided by caution and/or automation, internal standard method is most necessary for compensating instrument instability.

A mass spectrometer is a device for separation and detection of charged particles. Owing to its extreme sensitivity and unparalleled resolution, mass spectrometer has become a common tool for trace analysis. It is particularly indispensible for the studies of pharmacokinetics, drug metabolism, toxicology toxicokinetics, and clinical trials. When using a mass spectrometer for chemical analysis, the analyte has to be ionized first. Ionization of molecules is usually achieved in an ion source by high electric fields or particle bombardment. However, the stability of an electric field or bombast particle intensity in the ion source is never easy to maintain let alone the ion source is under constant input of a chromatographic effluent. Therefore, it is inevitable that determination sensitivity of mass spectrometry changes over time. Normally eight-hour variation an ion source can go beyond 30%. Thus, the accuracy of quantitative analysis with mass spectrometry without internal standard can only reach about 70%. In principle, internal standard method should be able to increase accuracy above 90%. However, the ionization efficiency is closely related to the structure of the substance, and the subtle differences in structure make the ionization efficiency to be very different. It is very difficult to find an internal standard substance whose ionization properties are consistent with those of the substance to be tested. At present, only the isotopologues of the analytes can be used as internal standards. Isotopologues are the replacement of certain elements in analytes with heavy isotopes, such as the replacement of hydrogen with deuterium, to obtain variant molecules that have higher molecular weight but structurally identical. When the analyte and such isotopologues are simultaneously introduced into the mass spectrometer to perform determination, the signals of the two can be distinguished due to the high resolution of the mass spectrometry. The ratio of their signal intensities is the basis of the quantification of the internal standard method. In summary, the only way to improve the quantitative accuracy of mass spectrometry at present is to use isotopologues as internal standards, which usually called isotope internal standards.

The current problems with mass spectrometry quantification are as follows: although isotope internal standards can increase the accuracy of mass spectrometry quantification from about 70% to more than 95%, which is comparable to the accuracy that can be achieved with other instruments, the cost of isotope internal standard synthesis is very high. At present, in addition to using this method in the analysis of clinical trials in the development of new drugs, most other applications, including preclinical experiments in the pharmaceutical process, cannot use this method due to high expenses and the time-consuming for the synthesis. This greatly hampers the widespread application of mass spectrometry technology, while also delaying the biopharmaceutical process and increasing costs. Moreover, if there is no problem that the internal standard is difficult to find, mass spectrometry technology can play a greater role in the field of clinical testing, environmental analysis, food safety and so on.

Therefore, the prior art still needs improvement and development.

SUMMARY

In view of the deficiencies of the aforementioned prior art, the objective of the present disclosure is to provide a method and a device of pseudo internal standard for mass spectrometry quantitative analysis, which aims at solving the problems of low accuracy and high cost of isotope internal standard existing in the conventional mass spectrometry quantitative technology.

The technical solution of the present disclosure is as follows:

A method of pseudo internal standard for mass spectrometry quantitative analysis includes the steps of:

weighing a standard substance to prepare standard solutions of different concentrations using a blank substrate of the sample to be tested, and then weighing the same standard substance to prepare internal standard solutions of one to a plurality of concentrations using the blank substrate of the sample to be tested, wherein an internal standard series have the same concentration range and span as the standard solutions;

processing the standard solutions and the internal standard solutions of the different concentrations to a standard sample and an internal standard sample via a sample processing steps;

injecting the standard sample and the internal standard sample into a chromatography-mass spectrometry system to perform analysis and determination;

plotting a ratio of determined peak areas between the standard sample and the internal standard sample versus the concentration to obtain a calibration curve; and processing the unknown sample by the same sample processing steps then following the same steps as standard sample analysis to inject the sample to be detected and the internal standard into the chromatography-mass spectrometry system to perform analysis and detection, the peak area ratio of the sample over the internal standard is then compared with the calibration curve to determine the concentration of the unknown sample.

According to the method of pseudo internal standard for mass spectrometry quantitative analysis, pausing the injector for a while after each completion of injection of the standard sample, after a time required for a determination of the standard sample is passed, the internal standard sample is injected to go through a chromatographic column of the chromatography-mass spectrometry system, the standard sample and the internal standard sample are separated and analyzed in the same detection cycle.

According to the method of pseudo internal standard for mass spectrometry quantitative analysis, the internal standard sample is injected after each completion of injection of the standard sample, and the internal standard sample directly enters the mass spectrometer in a manner of flow injection to perform determination bypassing the chromatographic column of the chromatography-mass spectrometry system.

According to the method of pseudo internal standard for mass spectrometry quantitative analysis, after each completion of injection of the standard sample, an internal standard sample with a concentration closest to a concentration of the standard sample is injected after a chromatographic peak of the standard sample is detected, and the internal standard sample directly enters the mass spectrometer in a manner of flow injection to perform determination bypassing the chromatographic column of the chromatography-mass spectrometry system.

According to the method of pseudo internal standard for mass spectrometry quantitative analysis, when the internal standard sample is injected by flow injection at a flow rate of 20% lower than a flow rate of a mobile phase in a sample analysis, or a flow of a spray gas during injecting is increased from 60 L/min to 70 to 100 L/min.

A device of pseudo internal standard for mass spectrometry quantitative analysis includes:

a chromatographic mobile phase and a mobile phase conveying device;

a sample injector connected to the mobile phase conveying device;

a chromatographic column connected to the sample injector;

a mobile phase switching device matched with the chromatographic column;

a mass spectrometer connected to the chromatographic column; and a software system configured to control the aforementioned hardware to implement pseudo internal standard mass spectrometry quantitative process;

the sample injector includes an injection needle and an injection valve connected to the injection needle configured to switch between an injection state and a sample-loading state, the injection needle and the injection valve are connected through a sample loop.

According to the device of pseudo internal standard for mass spectrometry quantitative analysis, the mobile phase switching device is two three-way switching valves connected to both front and back of the chromatographic column.

According to the device of pseudo internal standard for mass spectrometry quantitative analysis, the mobile phase switching device is a four-way switching valve connected to the chromatographic column.

According to the device of pseudo internal standard for mass spectrometry quantitative analysis, the mobile phase switching device is a six-way switching valve connected to the chromatographic column.

According to the device of pseudo internal standard for mass spectrometry quantitative analysis, the six-way switching valve is a six-way injection valve in an internal standard sample injector configured to inject the internal standard sample.

According to the device of pseudo internal standard for mass spectrometry quantitative analysis, the device further includes an internal standard sample injection device connected to a four-way switching valve. The internal standard sample injection device includes an internal standard sample injector connected to the four-way switching valve, a second mobile phase conveying device connected to the internal standard sample injector, and a second mobile phase storing device connected to the second mobile phase conveying device.

A use of the aforementioned device of pseudo internal standard, wherein the device of pseudo internal standard is applied for blood sample detection.

The beneficial effects: the present disclosure adopts a standard substance of a substance to be analyzed as an internal standard to perform mass spectrometry quantitative analysis. The "internal standard" is not added into the analytical sample, instead, it is separately introduced into the mass spectrometer. Specifically, after a signal of the analyte in the sample appears in the mass spectrometer, a known amount of the standard substance of the analyte is immediately introduced into the mass spectrometer as the internal standard. The ratio of the determined analyte signal to the adjacent internal standard signal is taken as the vertical ordinate of the calibration curve. Since the sensitivity change caused by the change of the mass spectrometry ionization conditions is very small within a very short time interval, the effect achieved by the quantitative method according to the present disclosure is similar to that of a conventional internal standard method, and the problem of inaccuracy of mass spectrometry quantification due to changes in ionization efficiency can be substantially eliminated. The present disclosure can achieve more than 95% accuracy without the use of isotope internal standards; the present disclosure also dramatically extends the linear response range of mass spectrometry quantitative analysis. In addition, the method and device of the present disclosure can accurately determine the concentration of the drug in the patient's blood sample after the drug is administered, thereby determining whether the drug used is effective for a specific patient, so as to achieve the purpose of precise drug use.

DETAILED DESCRIPTION OF THE EMBODIMENTS

Figure 1:
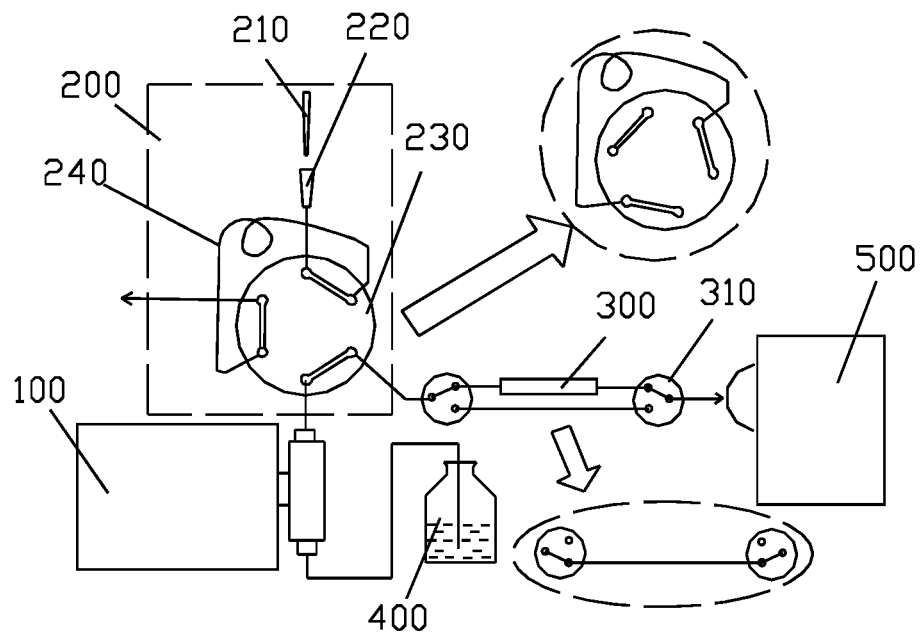
FIG. 1 is a schematic view according to a first embodiment of the present disclosure.

The present disclosure provides a method and a device of pseudo internal standard for mass spectrometry quantitative analysis. The above objects, features and advantages of the present invention will become more apparent by describing in detail embodiments thereof with reference to the accompanying drawings. It should be understood that the particular method and device embodying the invention are shown by way of illustration and not as a limitation of the invention.

The method of pseudo internal standard for mass spectrometry quantitative analysis according to an embodiment includes the steps of:

Weighing a standard substance to prepare standard solutions of different concentrations using a blank substrate of the sample to be tested, and then weighing the same standard substance to prepare internal standard solutions of one to a plurality of concentrations using the blank substrate of the sample to be tested, wherein an internal standard series have the same concentration range and span as the standard solutions;

Processing the standard solutions and the internal standard solutions of the different concentrations to a standard sample and an internal standard sample via a sample processing steps;

Injecting the standard sample and the internal standard sample into a chromatography-mass spectrometry system to perform analysis and determination;

Plotting the ratio of determined peak areas between the standard sample and the internal standard sample versus the concentration to obtain a calibration curve quantified by method of pseudo internal standard; and Injecting the unknown sample into the chromatography-mass spectrometry system to perform analysis and determination after processing the unknown sample via the sample processing steps, and then comparing a peak area of a tested signal with the calibration curve to determine the concentration of the unknown sample.

During the specific implementation process, after each completion of injection of the standard sample, it may be paused for a while (after a time required for the determination of the standard sample is completed, such as 30s, so as to ensure that a standard sample signal does not overlap with a subsequent internal standard sample signal), the internal standard sample is then injected to go through a chromatographic column of the chromatography-mass spectrometry system. Thus, the standard sample and the internal standard sample are separated and analyzed in the same detection cycle. Alternatively, the internal standard sample is further injected after each completion of injection of the standard sample, and the internal standard sample directly enters the mass spectrometer in a manner of flow injection to perform determination bypassing the chromatographic column. Alternatively, after each completion of injection of the standard sample, an internal standard sample with a concentration closest to a concentration of the standard sample is injected after a chromatographic peak of the standard sample is detected, and the internal standard sample directly enters the mass spectrometer in a manner of flow injection to be tested bypassing the chromatographic column. The principle is that the obtained internal standard sample signal is as close as possible to the standard sample signal without overlapping.

During the injection of the internal standard sample, a flow rate of injection is reduced by 20%, alternatively, a flow rate of a spray gas during injecting is increased from 60 L/min to 70 to 100 L/min (preferably 80 L/min). Pre-column injection has a higher sensitivity than post-column injection at the same concentration. This mainly caused by the change of spray efficiency. For this purpose, the spray efficiency of the post-column injection can be increased by adjusting the spray conditions, such that the purpose of eliminating the difference in sensitivity can be achieved. The specific approach is, on one hand, to reduce the flow rate of the post-column injection, making the spray more efficient, and such sensitivity differences can be eliminated by reducing the flow rate by about 20%; on the other hand, to increase the flow of the spray gas from 60 L/min to 70 to 100 L/min, which can reduce the difference to less than 5%.

The device of pseudo internal standard for mass spectrometry quantitative analysis is further provided according to an embodiment, which includes:

a chromatographic mobile phase and a mobile phase conveying device;

a sample injector connected to the mobile phase conveying device;

a chromatographic column connected to the sample injector;

a mobile phase switching device matched with the chromatographic column;

a mass spectrometer connected to the chromatographic column; and a software system configured to control the aforementioned hardware to implement pseudo internal standard mass spectrometry quantitative process;

The sample injector includes an injection needle and an injection valve connected to the injection needle configured to switch between a sample-loading state and a sample-injection state, the injection needle and the injection valve are connected through a sample loop.

In the device of pseudo internal standard for mass spectrometry quantitative analysis, the mobile phase switching device is two three-way switching valves connected to both front and back of the chromatographic column.

In the device of pseudo internal standard for mass spectrometry quantitative analysis, the mobile phase switching device is a four-way switching valve connected to the chromatographic column.

In the device of pseudo internal standard for mass spectrometry quantitative analysis, the mobile phase switching device is a six-way switching valve connected to the chromatographic column.

In the device of pseudo internal standard for mass spectrometry quantitative analysis, the six-way switching valve is a six-way injection valve in an internal standard sample injector configured to inject the internal standard sample.

The device of pseudo internal standard for mass spectrometry quantitative analysis further includes an internal standard sample injection device connected to the four-way switching valve. The internal standard sample injection device includes an internal standard sample injector connected to the four-way switching valve, a second mobile phase conveying device connected to the internal standard sample injector, and a second mobile phase storing device connected to the second mobile phase conveying device.

A use of the aforementioned device of pseudo internal standard is further provided according to an embodiment. The device of pseudo internal standard is applied in blood sample detection.

The present disclosure will be described in details hereinafter by way of the specific embodiments.

Embodiment 1: Pre-Column Internal Standard Injection

A standard substance was weighed using methanol as a solvent to prepare standard solutions of seven concentrations: 0.250, 0.500, 1.00, 2.00, 5.00, 8.00, and 10.0 µg/mL, and then the standard substance was weighed to prepare a standard solution of 2.50 µg/mL as an internal standard. With respect to the preparation of the standard sample, 50 uL of the aforementioned standard solution (seven concentrations) was weighed to add into 50 uL human blood serum and mixed, and then 100 uL methanol (cold) was added and shaken on a shaker for 5 min. Thus, the protein in the serum was precipitated and centrifuged to obtain a supernatant, which was injected into a chromatography-mass spectrometry system to perform analysis and determination. The hardware used in the illustrated embodiment is substantially the same as the usual LC/MS (liquid chromatography-mass spectrometry). However, it is necessary to add control software to the system to control sample injection, such that after each completion of injection of the standard sample (standard solutions of different concentrations), it can be paused for a while and then the internal standard sample was injected. The standard sample and the internal standard sample were separated and analyzed in the same detection cycle, except that the internal standard sample was introduced into the system later than the standard sample. The retardation time of the internal standard sample injection was determined during the development of the analytical method. After the chromatographic separation conditions were optimized, as long as a baseline width of an analyte signal was determined, the waiting time was set to be slightly larger than the baseline width. The key is that the signal generated by the later injected standard sample does not overlap with the previously injected sample signal.

Referring to FIG. 1, the working process thereof is as follows: 1) An injection needle 210 in a sample injector 200 was first inserted into a sample solution (not shown) driven by a robot hand (not shown), and then a needle pump (not shown) in the sample injector 200 directly connected to the injection needle 210 was immediately activated. The standard sample was quantitatively sucked by the injection needle 210, and in the illustrated embodiment, 5 uL standard sample was sucked. At the same time, the injection valve 230 was switched to a sample addition state. Next, the injection needle 210 that has been sampled was inserted into an injection port 220 connected to the injection valve 230 by the robot hand. The needle pump immediately pushed the standard sample within the needle into a sample loop 240 through the injection port 220, and the original liquid within the sample loop 240 was pushed into waste fluid. This process is called "sample loading" or "sample addition". 2) After the sample addition was complete, the injection valve immediately switched to a sample-injection state (as shown by the dotted circle in FIG. 1). At the moment, the sample loop 240 loaded with sample was in communication with a high pressure liquid phase pump 100 at one end thereof and in communication with the chromatographic column 300 at the other end thereof. At the same time, a solvent (mobile phase) in a mobile phase storing device 400 was conveyed through the sample loop 240 by the high pressure liquid phase pump 100, and the standard sample in the sample loop 240 was fed to the chromatographic column 300. This process is a sample-injection process, and a combined process of the sample addition and the sample injection is generally referred to as "injection". 3) The standard sample was fed to the chromatographic column 300 by the injection process, each chemical component in the standard sample interacted with filling materials in the chromatographic column 300 to generate adsorption. The mobile phase continuously flushed the chromatographic column 300 under the push of the high pressure liquid phase pump 100, such that the components in an adsorption state were constantly eluted to generate desorption. Each sample component was repeatedly subjected to adsorption-desorption between a stationary phase and the mobile phase of the chromatographic column 300, but was always driven by the mobile phase to move towards a direction of an outlet of the chromatographic column 300. Since the moving speed was related to a distribution coefficient of the substance between the mobile phase and the stationary phase, the components in the standard sample finally flowed out from the chromatographic column one after another due to their different distribution coefficients, and were separated from each other. 4) The separated standard sample components successively entered the ion source of mass spectrometer to perform ionization, and the generated ions were separated by the mass spectrometer 500 and then determined one by one. When performing quantitative analysis, the mass spectrometer 500 was set to only monitor the ions generated by the analyte and the internal standard thereof, and other ions were ignored. In this way, the integration time of the test signal can be increased, thereby increasing the test sensitivity, and the interference of the ions generated by other substances on the signal of the analyte can be eliminated.

In general, a sample analysis cycle including data acquisition is immediately started after a sample is injected into the system. The sample injector 200 only operates before the start of the analysis cycle, and there is no other task other than self-cleaning throughout the cycle. In the illustrated embodiment, after each standard sample was injected, 5 uL of 2.5 µg/mL of the internal standard sample was further injected about 0.5 min later. At that moment, the analysis cycle of the standard sample was still in progress, and the injection of the internal standard sample only allowed the sample injector 200 to perform a complete injection process again, which did not initiate a new sample analysis cycle.

Figure 3:
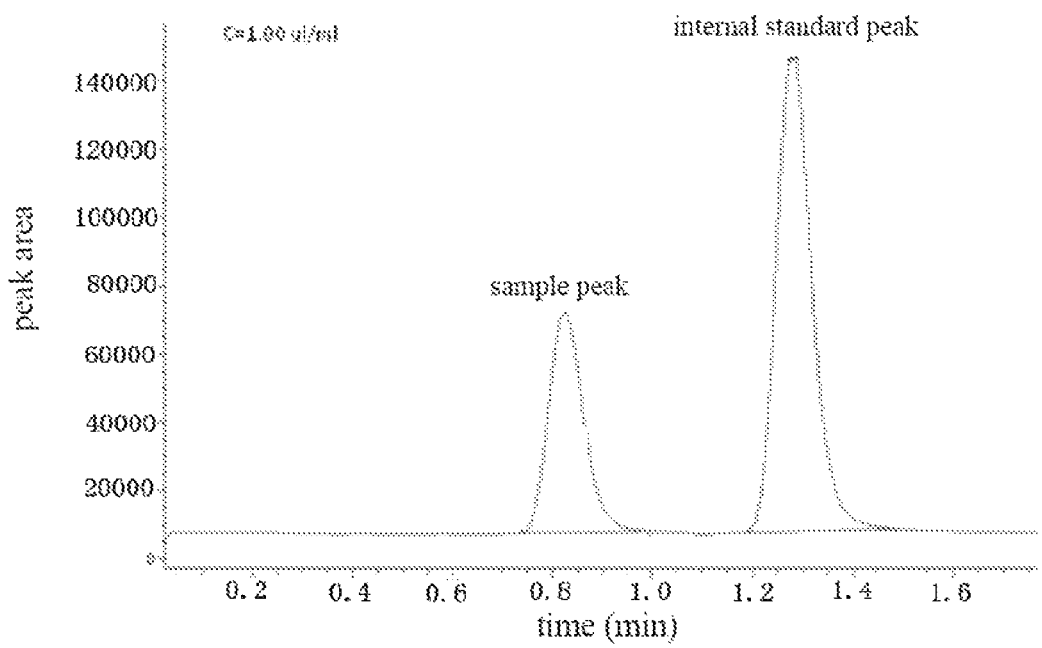
FIG. 3 is a chromatogram according to the first embodiment of the present disclosure.

Thus, the chromatographic data of the sample includes the (standard sample) sample peak and the (internal standard sample) internal standard peak, as shown in FIG. 3. The complete separation and close proximity between the sample peak and the internal standard peak are the basic principle for determining an injection time gap between the standard sample and the internal standard sample. The specific injection time gap is completely determined according to this principle in combination with the instrument conditions and signal width.

Figure 4:
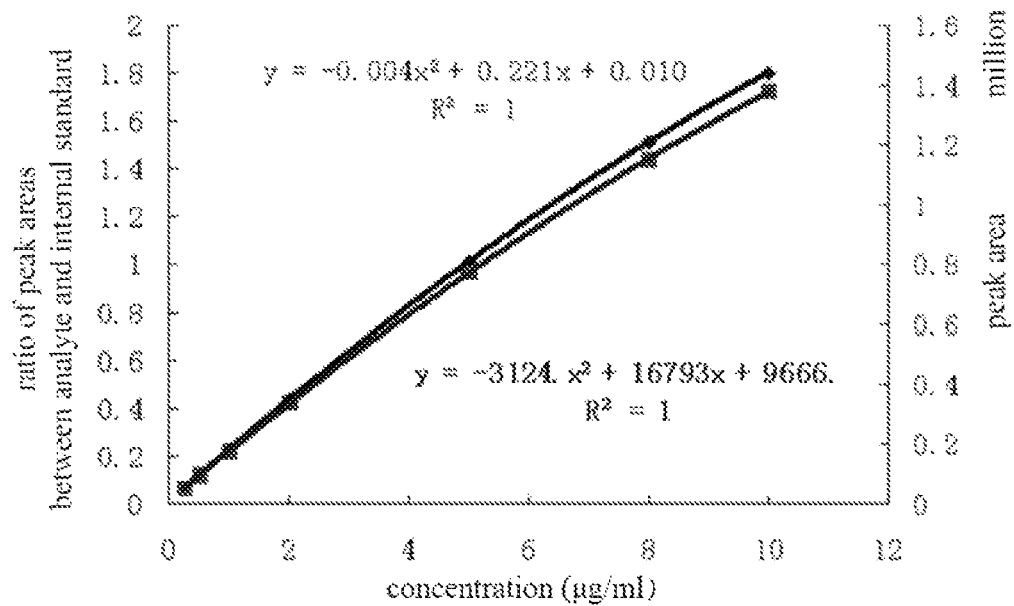
FIG. 4 is a standard curve at the beginning according to the first embodiment of the present disclosure.
Figure 5:
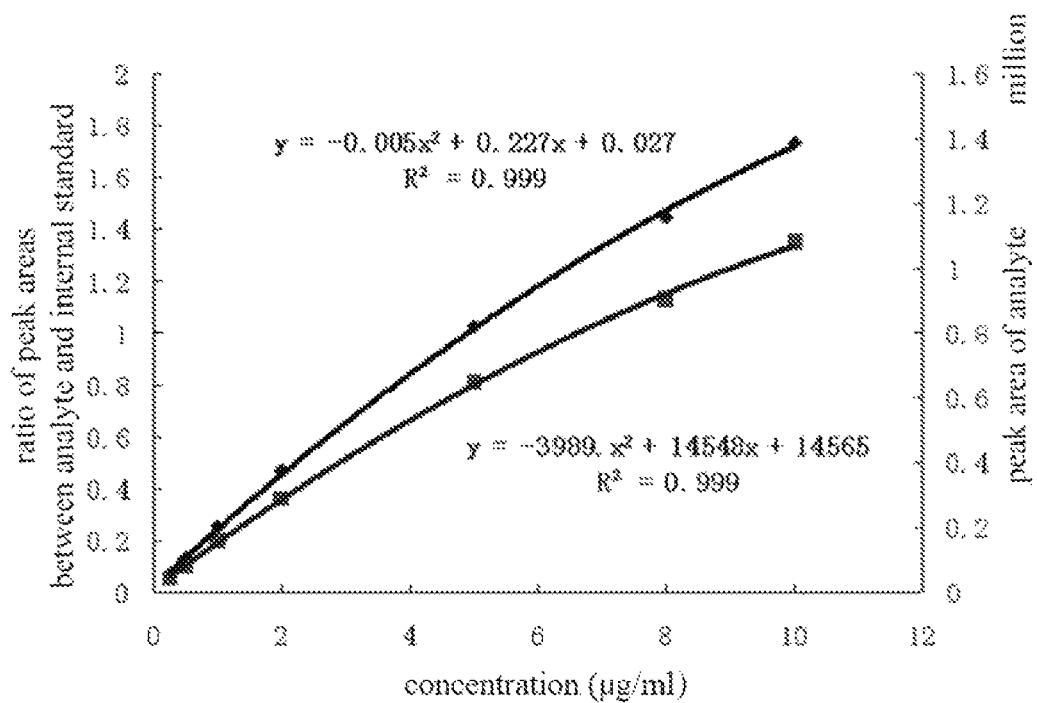
FIG. 5 is a standard curve after 2 hours according to the first embodiment of the present disclosure.

In the illustrated embodiment, in order to indicate the changes in the sensitivity of mass spectrometer over time, the analysis of the sample was repeated 10 times and 10 calibration curves were obtained with a time span of approximately two hours. FIG. 4 and FIG. 5 are diagrams of the first (at the beginning) and the tenth (after 2 hours) calibration curves, respectively. The analytes are the standard samples.

In FIG. 4 and FIG. 5, the lower curve (square mark) is a result of plotting peak area versus concentration without internal standard, and the upper curve (prismatic mark) is a result of plotting the ratio of peak areas of both the standard sample and the internal standard sample after using the internal standard. As can be seen from the two diagrams, the sensitivity of the calibration curve without the internal standard changes greatly before and after due to changes in ionization efficiency over time. The coordinate values of the two diagrams are the same. The maximum response value (peak area) of the calibration curve without the internal standard is decreased from about 1.4 million to less than 1.1 million, a change of 21.4%, while the change rate of the calibration curve after adding the internal standard is only 4.0%. The role of the pseudo internal standard is visualized by the aforementioned two calibration curves.

Embodiment 2: Post-Column Internal Standard Injection

The solution used in the illustrated embodiment was exactly the same as in Embodiment 1, except that the internal standard sample was directly injected into the mass spectrometer without going through the chromatographic column. The calibration curve quantified by mass spectrometry was already curved in the 10-fold concentration range, and the linear range was small. The post-column injection of internal standard can temporarily adjust the injection volume of the internal standard according to the size of the signal peak after the sample signal peak appeared, thereby correcting the nonlinear response of the instruments. Three internal standard concentrations were used in the illustrated embodiment, as shown in Table 1 below:

TABLE 1

| Sample concentration (μg/mL) | 0.250 | 0.500 | 1.00 | 2.00 | 5.00 | 8.00 | 10.0 |
|---|---|---|---|---|---|---|---|
| Internal standard concentration (μg/mL) | 0.500 | 0.500 | 0.500 | 2.50 | 2.50 | 10.0 | 10.0 |

Figure 2:
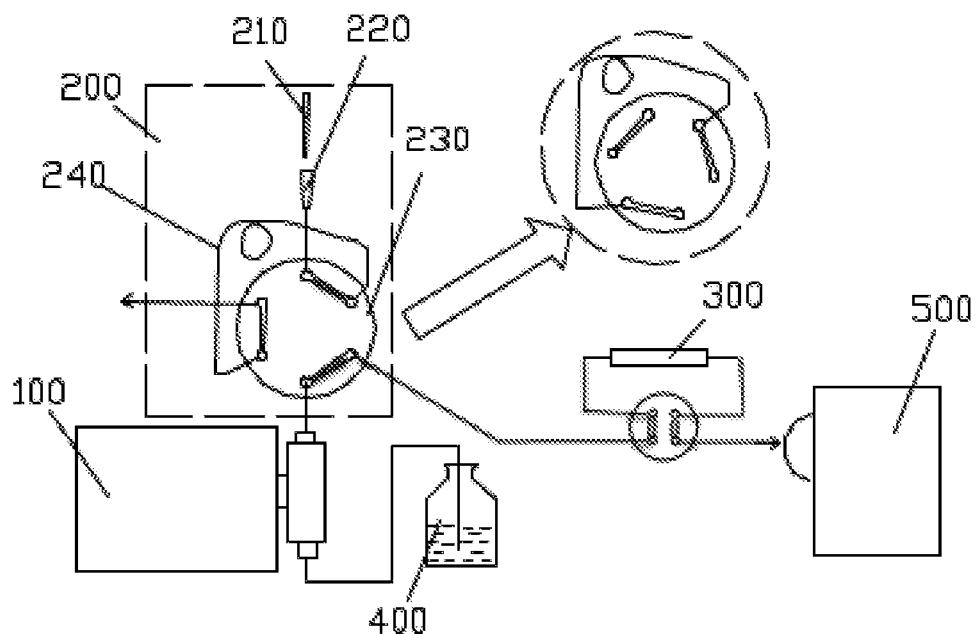
FIG. 2 is another schematic view according to the first embodiment of the present disclosure.
Figure 6:
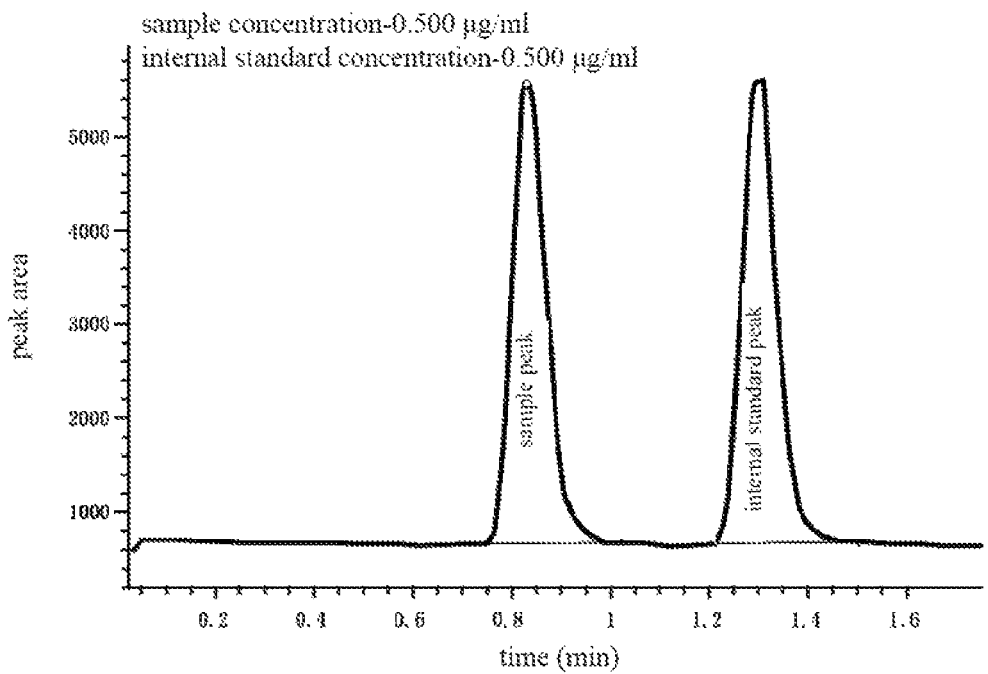
FIG. 6 is a chromatogram according to a second embodiment of the present disclosure.

The instrument used in the illustrated embodiment was another set of chromatography-mass spectrometry system, which had been modified. The control software of the illustrated embodiment was installed so as to read the data of the system in real time and to control the operations of the sample injector 200 and the external valve in the system according to the real-time data. With respect to the hardware, a flow injection passage was added to the original LC/MS system. Specifically, referring to FIG. 1, only two three-way switching valves 310 were added into the system. The two switching valves 310 always act synchronously resulting in one of two possible states: when both are switched to the upper position, the instrument is a typical LC/MS system; when both to the lower position, the system then becomes a flow injection analysis (FIA) system. The switching valves 310 are set at the upper position during sample analysis. In the present embodiment, the standard sample was injected by the sample injector 200 and then was delivered into the chromatographic column 300 for separation by the high pressure liquid phase pump 100, wherein the standard sample went through the three-way switching valve 310 in front of the column 300, then the column 300, then the three-way switching valve 310 after the column 300, and finally into the mass spectrometer. During this process, the control software always monitored the mass spectrometry signal of the analyte (standard sample), and controlled the sample injector 200 to switch the injection valve 230 to the sample loading position after the completion of injection. Once the sample peak appeared, the control software would calculate the peak area/height, select the internal standard sample based on the calculation, then immediately instruct the injector 200 to inject the selected internal standard at a calculated amount so that injection would produce a peak with about the same peak area/height as calculated. Meanwhile, the injection valve 230 was switched to the sample-injection state, and the two three-way switching valves 310 were simultaneously switched to the lower position, such that the internal standard sample directly entered the mass spectrometer bypassing the chromatographic column 300. The obtained data is substantially the same as that of Embodiment 1, as shown in FIG. 6. The two three-way switching valves 310 in FIG. 1 can also be replaced by a four-way switching valve 380 connected as shown in FIG. 2. At the time of switching the two three-way switching valves 310 in the aforementioned steps, the four-way switching valve 380 is switched to the chromatographic column 300 to be short-circuited, and the mobile phase directly enters the mass spectrometer without going through the chromatographic column 300, and the achieved effect is exactly the same as the above process.

Figure 7:
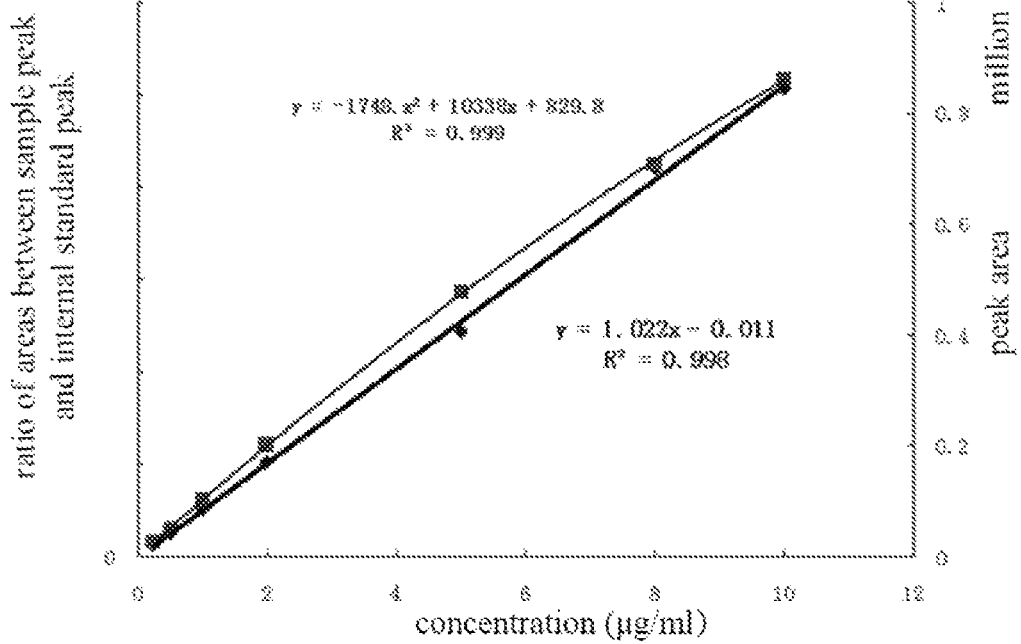
FIG. 7 is a standard curve at the beginning according to the second embodiment of the present disclosure.
Figure 8:
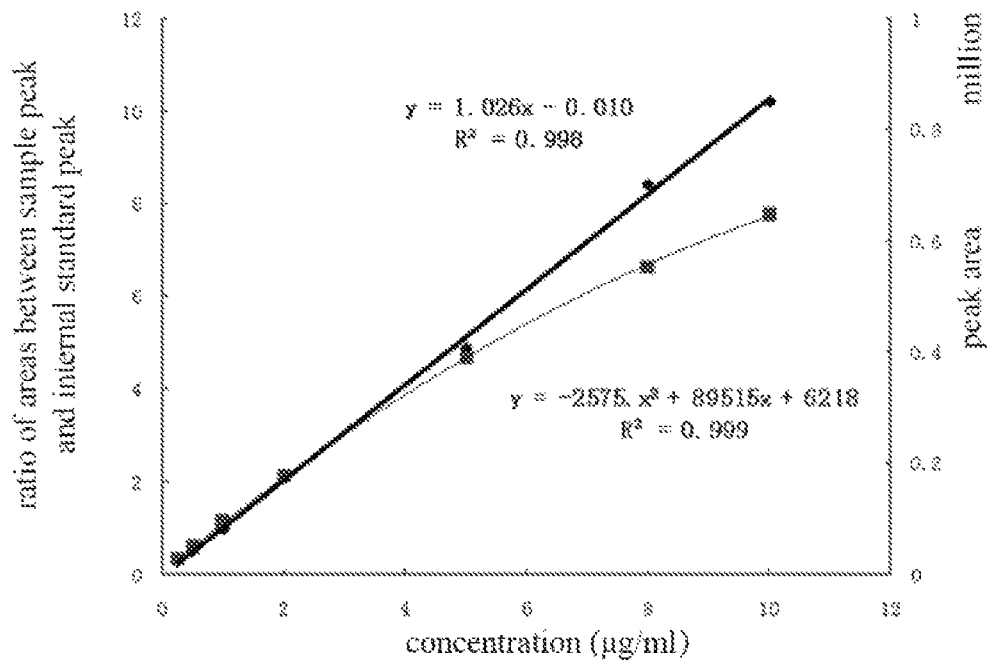
FIG. 8 is a standard curve after 2 hours according to the second embodiment of the present disclosure.

In order to indicate the changes in the sensitivity of the mass spectrometer over time in the illustrated embodiment, the analysis of the sample was repeated 10 times and 10 calibration curves were obtained with a time span of approximately two hours. FIG. 7 and FIG. 8 are diagrams of the first (at the beginning) and the tenth (after 2 hours) calibration curves, respectively.

Figure 9:
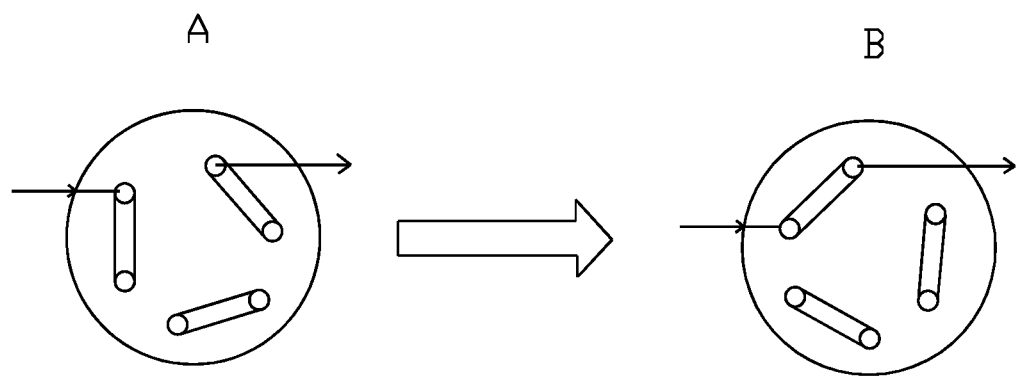
FIG. 9 is a state variation diagram of a six-way switching valve according to the second embodiment of the present disclosure.

The internal standard passage can also use a six-way switching valve instead of the aforementioned two three-way switching valves 310, which is connected as shown in FIG. 9.

The advantage of using the six-way switching valve is that only one valve needs to be controlled, such that pipeline blockage due to hardware failure or software malfunction can be avoided. If the two three-way switching valves 310 are not synchronously switched, the mobile phase will be blocked and the system will overpressure. The use of the six-way switching valve does not require synchronous switching, and therefore does not cause the system overpressure problems. As in the previous case of using the two three-way switching valves, the state A in FIG. 9 is configured to sample analysis, in which the sample must be separated through the chromatographic column 300 and then fed into the mass spectrometer to be detected. The six-way switching valve is not switched to B state until the control software found the appearance of the sample peak, and the sample injector 200 is then instructed to inject an appropriate internal standard sample. In B state, the injected internal standard sample is fed directly into the mass spectrometer by the mobile phase to be detected without going through the six-way switching valve.

Figure 10:
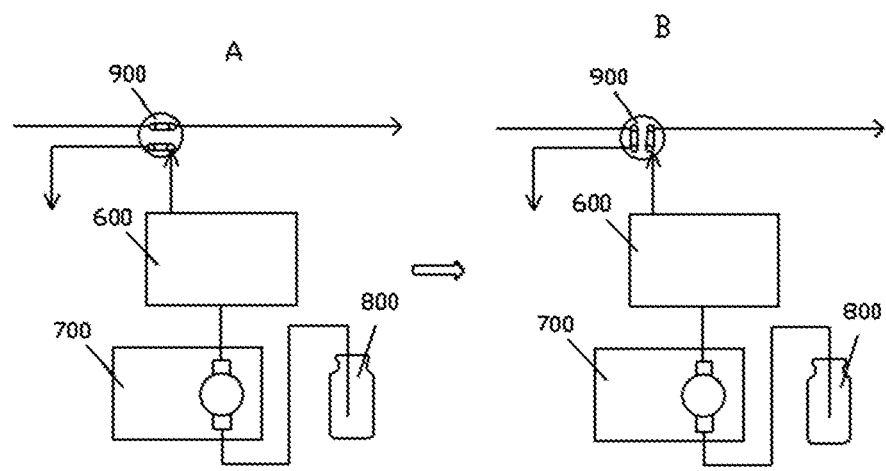
FIG. 10 is a state variation diagram of an internal standard sample injection device according to the second embodiment of the present disclosure.

Since there are many brands of sample injectors on the instrument market, in order to avoid duplicated efforts to make drive programs for controlling various sample injectors during software development, an internal standard sample injection device shown in FIG. 10 is further designed according to the embodiment. This is a flow injection system, which is specifically configured to introduce an internal standard after the chromatographic column 300, in order to use the internal standard to eliminate instrument fluctuations during sample testing and to correct the non-linear response of the instrument. This flow injection system is combined with the aforementioned system via a four-way switching valve 900 to work cooperatively. The working mechanism thereof is as follows: 1) The internal standard was introduced into a pipeline leading to the mass spectrometer by an internal standard sample injector 600 in the device (equipped with an internal standard sample injector); 2) A liquid phase pump (the second mobile phase conveying device 700) delivers the mobile phase from a mobile phase storage device (i.e., the second mobile phase storage device 800) into the internal standard sample injector 600 and further into the mass spectrometer 500 along the pipeline; 3) The mass spectrometer 500 detects the internal standard and gives a signal with about the same intensity as the chromatographic peak. If the mass spectrometer was connected to a liquid chromatogram, the mobile phase must use a solvent or buffer solution that can help ionization.

The control software controlled the operations of the entire device. Sample separation and analysis were performed by a usual chromatography-mass spectrometry system. During sample analysis, the control software continuously monitored the mass spectrometry signal of the analyte (sample). Once the signal of the analyte (sample) was found, the software selected the internal standard according to the signal intensity, and then instructed the internal standard sample injector 600 to load the selected internal standard. After the signal peak of the analyte completed, the software immediately switched the four-way switching valve 900 in the device to the B state in FIG. 10, and then instructed the internal standard sample injector 600 to inject samples. At the same time, the second mobile phase conveying device was activated to feed the internal standard to the mass spectrometer 500 by the second mobile phase. The entire device was in the A state (ready for use) before the signal of the analyte completely appeared. After the internal standard flow injection process was completed, the four-way switching valve 900 was immediately switched back to the A state in FIG. 10 to stand by. With respect to the sample analysis system, the internal standard sample injection device does not intervene at all and operates completely silently behind the scenes.

The greatest advantage of post-column introduction of internal standards is that the injection volume of the internal standard sample can be immediately determined according to the signal intensity of the sample, such that the size of the signal peak generated by the internal standard sample is close to that of the signal peak generated by the sample. By such dynamic control, the illustrated embodiment can not only improve accuracy in the analytical results by compensating the draft of ionization efficiency, but also extend the linear response range of mass spectrometry quantification by more than 10 times or even tens of thousands times.

Embodiment 3: Dynamic Internal Standard Sample Injection

Figure 11:
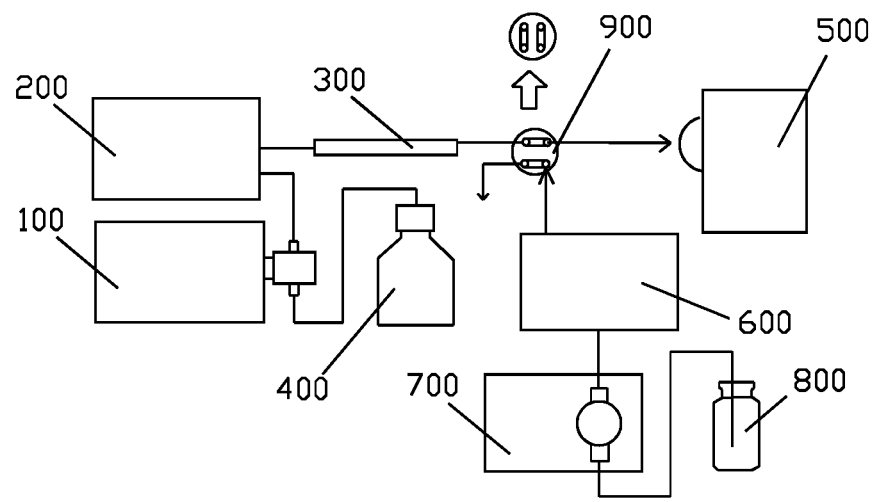
FIG. 11 is a schematic view according to a third embodiment of the present disclosure.

The illustrated embodiment can both control the LC/MS system and acquire data by itself, and simultaneously control the internal standard sample injection device shown in FIG. 10, such that all hardware form a complete analytical system. FIG. 11 is a schematic view of the system. The sample analysis process is as follows: 1) A standard sample was introduced into an analysis pipeline by a sample injector 200; 2) A high pressure liquid pump 100 continuously conveyed a mobile phase in a mobile phase storage device 400 to deliver the sample to the chromatographic column 300 for separation, and then the sample is fed into a mass spectrometer 500 to be detected; 3) The mass spectrometer 500 always acquires signals after sample injection; 4) After the chromatogram peak of the analyte appeared, the internal standard injection portion was activated immediately. At this time, a four-way switching valve 900 was switched, such that the sample passage led to the waste fluid, and the internal standard passage was connected to the mass spectrometer 500. The internal standard sample entered the mass spectrometer through the internal standard sample injection device to be detected, and an internal standard peak apeared after the appearance of the sample peak.

Using this system, two series of human serum samples with a concentration difference of 100 times: 0.0100, 0.0500, 0.100, 1.00, 2.00, 5.00, 10.0, 20.0, 50.0, and 100 μg/mL were first prepared in parallel using a standard sample. Each sample was prepared by pipetting 50 uL of the serum sample, adding 200 uL of methanol (cold) so as to precipitate the protein in the serum, and then transferring a supernatant into a vial after centrifugal separation. One series of the prepared standard samples was put into the sample injector 200, and the other series thereof was put into the internal standard sample injector 600 as the internal standard sample. The standard samples were analyzed by 5 uL per injection by the aforementioned analysis process. After the signal of the sample peak appeared, the four-way switching valve 900 in the system was immediately switched to a position of the internal standard injection. At the same time, the software calculated an approximate concentration corresponding to the sample peak. The internal standard sample injector 600 then injected 5 uL of the internal standard sample with the closest concentration. Since the pipeline of the flow injection is short and the internal diameter of the pipeline is very small, the internal standard peak can be introduced into the mass spectrometer within a very short time after the appearance of the sample peak. The shorter the interval between the sample peak and the internal standard peak, the better the correction effect of the internal standard. However, the ionization efficiency of the mass spectrometer is not changed instantaneous, and the amplitude of variation within the time range of one minute or so is generally negligible. Therefore, the injection time of the internal standard does not need to be controlled with high accuracy, and the accuracy in the range of seconds is sufficient.

Figure 12:
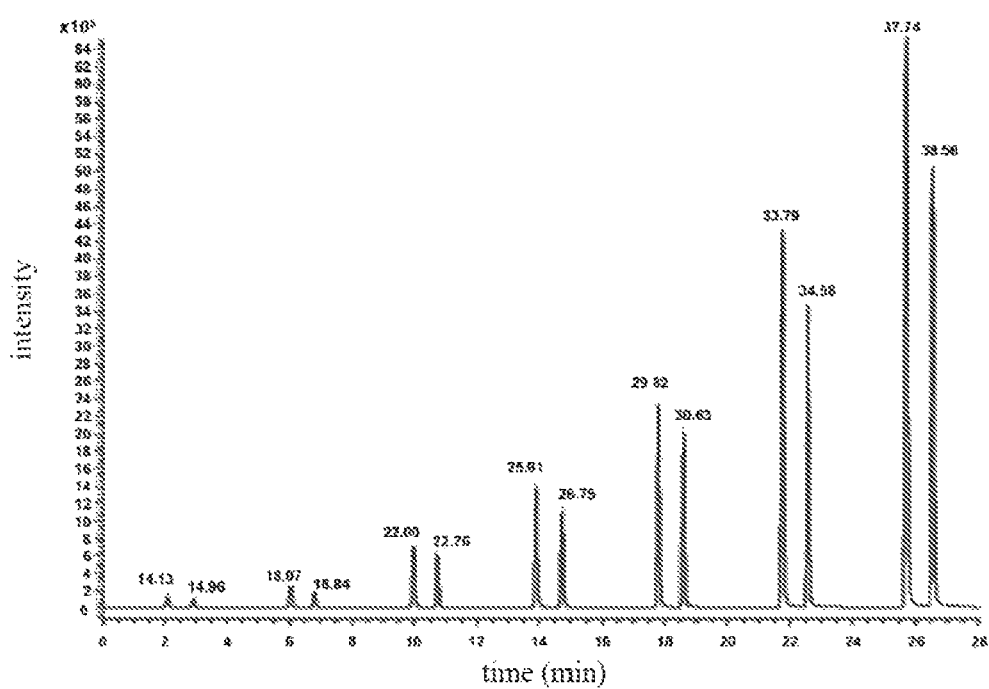
FIG. 12 is a chromatogram according to the third embodiment of the present disclosure.

The illustrated embodiment used the software to control, such that chromatographic data analyzed by a plurality of samples were stored in the same data file and the time axis remained continuous. In order to test the changes in the sensitivity of the mass spectrometer over time, the test of the sample series was repeated 10 times, and a gap of 15 minutes was also added between each time. The total time was nearly 7 hours. A resulted chromatogram is shown in FIG. 12.

In the implementation process, no errors occurred in each selection of the internal standard. In other words, each time the software accurately calculated which internal standard sample to use for internal standard injection. However, as can be seen from the obtained results, although the internal standard sample and the standard sample actually have the same concentration and use the same flow rate, the obtained internal standard peak is about 20% lower than the sample peak. In other words, the mass spectrometer gives higher signal response for the sample going through the chromatographic column than that introduced by direct injection. The same experiment was performed on the gas chromatography-mass spectrometry system using the same sample, and no such problem occurred. In addition, the illustrated embodiment demonstrates that, since the column pressure is high (about 100 MPa), the pre-column flow rate of the liquid going through the chromatographic column is reduced due to the liquid volume compression, and the post-column flow rate will be increased due to the volume expansion. However, the overall flow rate does not change. This results in a higher linear velocity when entering the mass spectrometer than that of flow injection. Since an electrospray ionization source is used in the illustrated embodiment, the better the spray effect, the higher the ionization efficiency, and the stronger the obtained signal of mass spectrometry. The greater the linear velocity when the liquid coming out of the spray port, the better the spray effect. Thus, it can be seen that the method of introducing the internal standard by the aforementioned post-column flow injection would not compensate the change in signal intensity caused by changes chromatographic backpressure during the sample analysis. However, the aforementioned system has a great advantage: any interference that appears behind the analysis peak will not affect the internal standard peak, because the internal standard is introduced into the mass spectrometer while the sample stream is diverted into the waste.

Figure 13:
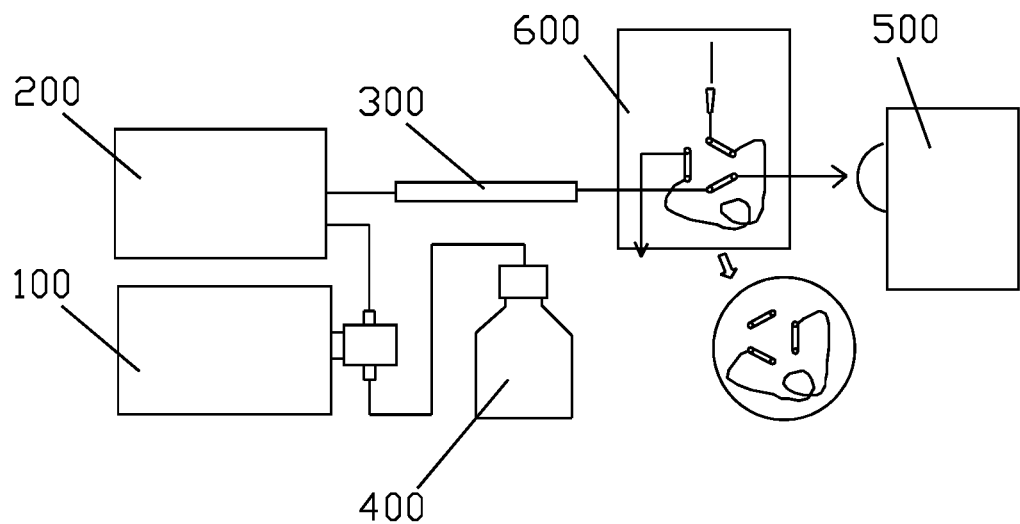
FIG. 13 is another schematic view according to the third embodiment of the present disclosure.

In the illustrated embodiment, the system shown in FIG. 13 was used to directly introduce the internal standard sample into the solvent flow behind the chromatographic column 300, such that the aforementioned problem that the internal standard peak is lower than the sample peak can be successfully solved. The operation process of the system according to the illustrated embodiment was substantially same as that of the aforementioned system. The difference is that, the sample valve of the internal standard sample injector 600 was directly connected to the analysis pipeline, and the six-way switching valve of the internal standard sample injector 600 was switched to the sample-injection position at the time of the aforementioned switching of the four-way switching valve. Thus, the internal standard sample was driven by the analytical mobile phase to obtain the same linear velocity and entered the mass spectrometer, the resulting signal intensity is the same.

Figure 14:
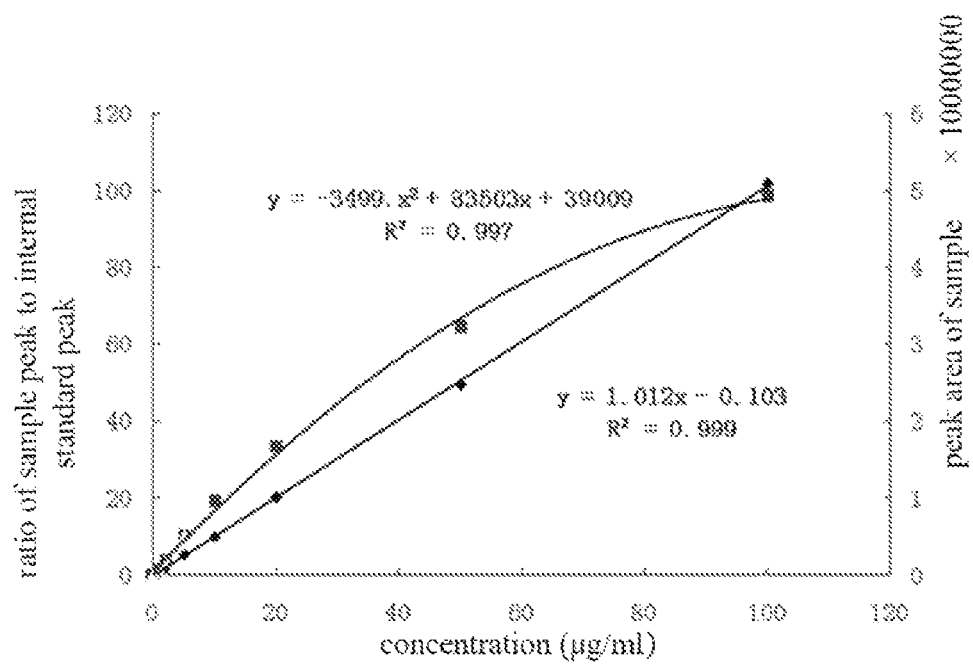
FIG. 14 is a standard curve at the beginning according to the third embodiment of the present disclosure.
Figure 15:
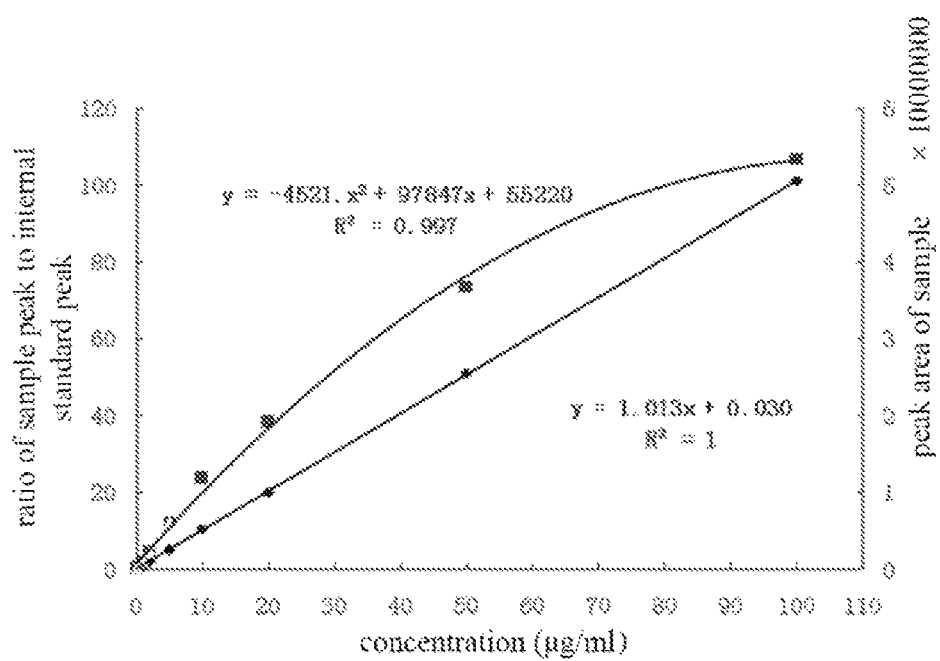
FIG. 15 is a standard curve after 7 hours according to the third embodiment of the present disclosure.

In the illustrated embodiment, the analysis of the sample was repeated 10 times and 10 calibration curves were obtained with a time span of approximately seven hours. FIG. 14 and FIG. 15 are diagrams of the first (at the beginning) and the tenth (after 2 hours) calibration curves, respectively.

It can be clearly seen from the figures that when there is no internal standard, the calibration curve can only use the quadratic fitting curve to represent the obtained data. In addition, the degree of fitting is not ideal, and the fitting coefficient $R^2$ has only two 9's after the decimal point. In particular, comparing the data collected at the beginning and the data collected at 7 hours, the coefficients of the fitting function differ greatly, and the shapes clearly show the difference. After using the method of the dynamic internal standard injection according to the illustrated embodiment, the internal standard sample signal almost completely corrects the fluctuation of the standard sample signal, and at the same time, the problem of nonlinear response of the instrument is completely solved, such that the linear response range of the instrument is greatly extended. The calibration curve after using the internal standard is almost an ideal straight line. The R value has four 9's after the decimal point, and the ideal value is 1. Moreover, the slope of the straight line changes less than one-thousandth. The slope represents sensitivity, and changes in sensitivity are key factors that cause inaccurate results. When the internal standard is not used, the analytical sensitivity changes not only with time but also with concentration. The calibration curve with only 10-fold concentration range (as shown in embodiments 1 and 2) without internal standard is curved. Embodiments 1 and 2 further show that the sensitivity of the mass spectrometer dropped by 14% over 2 hours, while embodiment 3 increased by 25.4% after 7 hours. It can be seen that the sensitivity change in the detection is likely to be caused by a variety of uncertainties, and the direction of change over time cannot be predicted. The use of the internal standard method according to the illustrated embodiment can very effectively compensate those changing factors, and the trouble of searching for an internal standard can be significantly saved by directly using the standard substance of the substance to be tested as the internal standard. Especially with respect to drug analysis, the present disclosure avoids the use of isotope internal standards, which can save a lot of costs and accelerate the progress of drug clinical trials.

The present disclosure is particularly suitable for the analysis of the concentration of a drug in blood samples, and is especially suitable for the establishment of a drug-time curve. In medication or drug development, patients or subjects are drawn blood samples by time after medication. After the blood sample is tested, the concentration of the drug in each blood sample is plotted versus time, and such diagram is called the drug-time curve. In three embodiments of the present disclosure, all sample processing and analysis was performed according to the specifications of the blood sample analysis. The development of the application of mass spectrometry quantitation in the field of clinical drug detection is also an main goal of the present invention.

Although the present invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of pseudo internal standard for mass spectrometry quantitative analysis, the method comprising:
    weighing a standard substance to prepare standard solutions of different concentrations using a blank substrate of a test sample to form a calibration series having a concentration range;
    then weighing the same standard substance to prepare internal standard solutions of the different concentrations using the blank substrate of the test sample to form an internal standard series having the concentration range of said calibration series;

processing said standard solutions by a standard sample treatment process to obtain standard samples and processing said internal standard solutions by the sample treatment process to obtain internal standard samples;

analyzing said standard samples one by one on a chromatography-mass spectrometry system by injecting one of said standard samples followed by injecting one of said internal standard samples;

plotting ratios (R) between a peak area of said standard samples ($A_{std}$) and a normalized peak area of said internal standard samples ($A_{is}/Cd_{is}$, where $A_{is}$, and $C_{is}$ are the peak area and concentration of said internal standard sample, respectively, wherein $R=A_{std} \cdot C_{is}/A_{is}$ versus the different concentrations of said standard samples ($C_{std}$) to establish a calibration curve and a fitting equation thereof;

processing the test sample by the same sample treatment process then injecting the processed test sample and one of the internal standard samples into the chromatography-mass spectrometry system to perform analysis, wherein after a chromatographic peak of a test sample is detected, estimating the sample concentration and amount based on a previous calibration curve, selecting an internal standard sample with a concentration closest to the estimated one, calculating the volume needed to match the sample amount, then injecting the selected internal standard sample with the calculated volume; and calculating a test sample concentration by substituting a test sample ratio between a test sample peak area of the test sample and the normalized peak area of the selected internal standard sample into the fitting equation of the calibration curve.

2. The method of claim 1, further comprising:

pausing an injector after each completion of injection of said standard sample—for a time required for a chromatographic peak to be complete;

wherein said selected internal standard sample goes through a chromatographic column of the chromatography-mass spectrometry system;

wherein said standard sample and said selected internal standard sample are separated and analyzed in a same detection cycle.

3. The method of claim 1, wherein:

said selected internal standard sample is injected after completion of the chromatographic peak of said standard sample or a test sample; and said selected internal standard sample directly enters the mass spectrometer in a manner of flow injection to perform detection bypassing said chromatographic column of said chromatography-mass spectrometry system.

4. The method of claim 3, wherein when said selected internal standard sample is injected using the flow injection, a flow rate of the flow injection is 20% lower than a flow rate of a mobile phase in the sample analysis, or the flow of spray gas is increased from 60 PSI to 70 to 100 PSI.

5. The method of claim 1, wherein:

after a chromatographic peak of the standard sample is detected, injecting an internal standard sample with a concentration closest to a concentration of said standard sample;

after a chromatographic peak of a test sample is detected, estimating the sample concentration and amount based on a previous calibration curve, selecting an internal standard sample with a concentration closest to the estimated one, calculating the volume needed to match the sample amount, then injecting the selected internal standard sample with the calculated volume.

* * * * *